(12) United States Patent
Shoemake et al.

(10) Patent No.: US 7,830,782 B2
(45) Date of Patent: Nov. 9, 2010

(54) METHOD OF USING GUARD TONES IN OFDM SYSTEMS FOR INCREASING ROBUSTNESS

(75) Inventors: Matthew B. Shoemake, Allen, TX (US); Sridhar Rajagopal, Allen, TX (US); Lee Bradshaw, Douglasville, GA (US)

(73) Assignee: QUALCOMM Incorporated, San Diego, CA (US)

( * ) Notice: Subject to any disclaimer, the term of this patent is extended or adjusted under 35 U.S.C. 154(b) by 1559 days.

(21) Appl. No.: 11/125,714

(22) Filed: May 10, 2005

(65) Prior Publication Data

US 2005/0271088 A1  Dec. 8, 2005

Related U.S. Application Data

(60) Provisional application No. 60/569,692, filed on May 10, 2004.

(51) Int. Cl.
*H04J 11/00* (2006.01)

(52) U.S. Cl. ...................................... 370/208
(58) Field of Classification Search ............... None
See application file for complete search history.

(56) References Cited

U.S. PATENT DOCUMENTS

| | | | |
|---|---|---|---|
| 6,510,133 B1 * | 1/2003 | Uesugi | 370/208 |
| 6,775,254 B1 * | 8/2004 | Willenegger et al. | 370/329 |
| 2004/0131022 A1 * | 7/2004 | Ito | 370/320 |
| 2004/0170217 A1 * | 9/2004 | Ho | 375/134 |

OTHER PUBLICATIONS

Weinstein et al., "Data Transmission by Frequency-Division Multiplexing Using the Discrete Fourier Transform", IEEE Transactions on Communication Technology, vol. COM-19, No. 5, Oct. 1971, pp. 628-634.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

* cited by examiner

*Primary Examiner*—Raj K Jain
(74) *Attorney, Agent, or Firm*—Dang M. Vo (57) ABSTRACT

The present invention provides a method and system for increasing communication robustness between wireless communication devices by transmitting data on Orthogonal Frequency Division Multiplexing (OFDM) guard tones. In one embodiment, punctured bits are sent on the guard tones. In an alternate embodiment, the full bandwidth provided by the guard tones in used to determine the optimal puncture pattern. The present invention can also use guard tones to duplicate data from those tones which are experiencing channel interference. The receiver feeds back information about tones in interference, and the transmitter send the interfered data on the guard tones. Guard tones are used for sending feedback information to the transmitter in order to increase system robustness. This provides the transmitter with information on how to use the guard tones and adapt the transmission data rates to maximize system performance.

32 Claims, 6 Drawing Sheets

Transmitter

Prior Art

Fig. 5

Transmitter

Fig. 6

Transmitter

Fig. 7

Receiver

Fig. 8

METHOD OF USING GUARD TONES IN OFDM SYSTEMS FOR INCREASING ROBUSTNESS

CROSS-REFERENCE TO RELATED APPLICATIONS

This application claims the benefit of and priority to U.S. Provisional Patent Application No. 60/569,692 filed May 10, 2004 the technical disclosures of which are hereby incorporated herein by reference.

TECHNICAL FIELD

The present invention relates generally to wireless communications systems, such as a multi-band OFDM (Orthogonal Frequency Division Multiplexing) communication system. More specifically, the present invention relates to a method for increasing system robustness by using unused bits left open by the signal standards.

BACKGROUND OF THE INVENTION

In a conventional serial data system, symbols are transmitted sequentially, with the frequency spectrum of each data symbol allowed to occupy the entire bandwidth. A parallel data transmission system is one in which several sequential streams of data are transmitted simultaneously. In a parallel system, the spectrum of an individual data element normally occupies only a small part of the available bandwidth.

In a classic parallel data system, the total signal frequency band is divided into N overlapping frequency subchannels. Each subchannel is modulated with a separate symbol. The subchannels are then multiplexed.

Orthogonal signals can be separated at the receiver by using correlation techniques, eliminating inter-symbol interference. This can be achieved by carefully selecting carrier spacing so as to let the carrier spacing equal the reciprocal of the useful symbol period. Orthogonal Frequency Division Multiplexing (OFDM) is a form of multicarrier modulation wherein carrier spacing is selected so that each subcarrier is orthogonal to the other subcarriers.

This orthogonality avoids adjacent channel interference and prevents the demodulators from seeing frequencies other than their own. The benefits of OFDM are high spectral efficiency, resiliency to Radio Frequency (RF) interference, and lower multi-path distortion.

In OFDM the subcarrier pulse used for transmission is chosen to be rectangular. This has the advantage that the task of pulse forming and modulation can be performed by a simple Inverse Discrete Fourier Transform (IDFT) which can be implemented very efficiently as an Inverse Fast Fourier Transform (IFFT). Therefore, the receiver only needs a FFT to reverse this operation.

Incoming serial data is first converted from serial to parallel and grouped into x bits each to form a complex number. The number x determines the signal constellation of the corresponding subcarrier, such as 16 Quadrature Amplitude Modulation. The complex number are modulated in a baseband fashion by the IFFT and converted back to serial data for transmission. A guard symbol is inserted between symbols to avoid inter-symbol interference (ISI) caused by multi-path distortion. The discrete symbols are converted to analog and low-pass filtered for RF up-conversion. The receiver then simply performs the inverse process of the transmitter.

Figure 1:
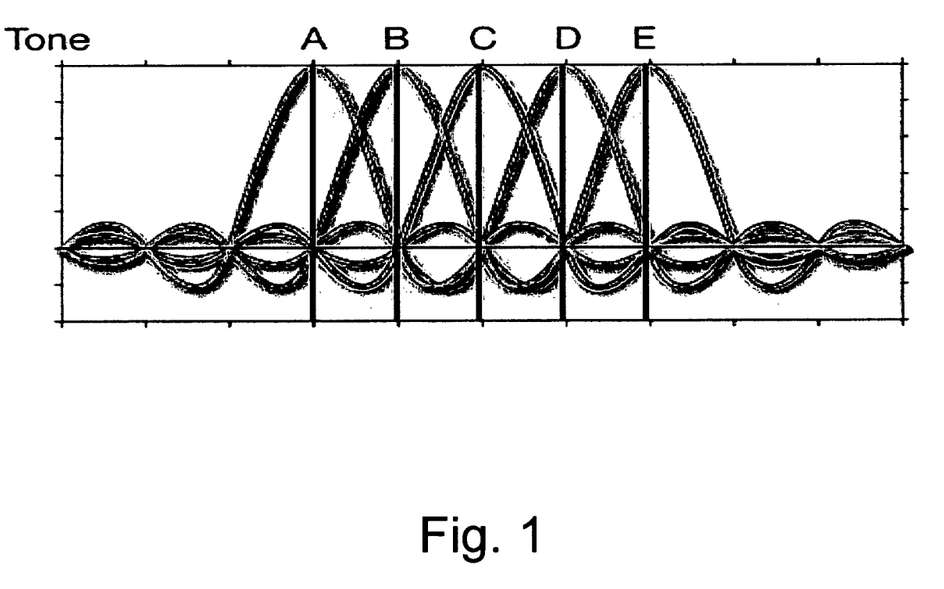
FIG. 1 shows an OFDM signal.

According to the theorems of the Fourier Transform the rectangular pulse shape will lead to a $\sin(x)/x$ type of spectrum of the subcarriers, as illustrated in FIG. 1. The spectrums of the subcarriers are not separated but overlap. The reason why the information transmitted over the carriers can be separated is the orthogonality relation. By using an IFFT for modulation, the spacing of the subcarriers is chosen such that at the frequency where a received signal is evaluated (indicated by letters A-E in FIG. 1) all other signals are zero.

The seminal article on OFDM is "Data Transmission by Frequency-Division Multiplexing Using the Discrete Fourier Transform", by S. B. Weinstein and Paul M. Ebert in *IEEE Transactions on Communication Technology*, Vol. com-19, No. 5, October 1971, the contents of which are hereby incorporated by reference.

OFDM forms the basis for the Digital Audio Broadcasting (DAB) standard in the European market as well as the basis for the global Asymmetric Digital Subscriber Line (ADSL) standard. Development is ongoing for wireless point-to-point and point-to-multipoint configurations for Wireless Local Area Networks using OFDM technology.

In a supplement to the IEEE 802.11 standard, the IEEE 802.11 working group published IEEE 802.11a, which outlines the use of OFDM in the 5.8-GHz band.

In a packet communication system, data that is communicated is first packetized into packets of data, and the data packets, once formed, are then communicated, sometimes at discrete intervals. Once delivered to a receiving station, the information content of the data is ascertained by concatenating the information parts of the packets together. Packet communication systems generally make efficient use of communication channels as the communication channels need only to be allocated pursuant to a particular communication session only for the period during which the data packets are communicated. Packet communication channels are sometimes, therefore, shared communication channels that are shared by separate sets of communication stations between which separate communication services are concurrently effectuated.

A structured data format is set forth in the present promulgation of the operating specification. The data format of a data packet formed in conformity with the IEEE 802.15.3a includes a preamble part and a payload part. Other packet communication systems analogously format data into packets that also include a preamble part and a payload part. The payload part of the packet contains the information that is to be communicated. That is to say, the payload part is nondeterminative. Conversely, the preamble part of the data packet does not contain the informational content that is to be communicated but, rather, includes determinative data that is used for other purposes. In particular, the preamble part of an IEEE 802.15.3a packet preamble includes three parts, a packet sync sequence, a frame sync sequence, and a channel estimation sequence. The packet sync sequence is of a length of twenty-one OFDM (symbols), the frame sync sequence is of a length of three OFDM symbols, and the channel estimation sequence is of a length of six OFDM symbols. Collectively, the sequences are of a time length of 9,375 microseconds.

Of particular significance, the preamble also is used for channel estimation. The radio channel upon which the packet is communicated undergoes reflections and is otherwise distorted during its communication to the receiving station. To receive the transmitted data correctly, the receiving station must be provided with a good estimate of the channel to permit proper compensation to be made of the channel. The channel estimation sequence is a known wave form that tells the receiver what the channel looks like. From this known wave form, the receiver can properly extrapolate unknown sequences.

FCC regulations for ultra wideband (UWB) stipulate that the bandwidth should exceed 500 MHz. The current use of guard tones in the Multiband OFDM alliance has not been specified clearly and violates the 500 MHZ requirements. The tones cannot be used to transmit random noise. The usage of guard tones as specified by the standard is to help make analog filters easier to design. However, it is possible to design analog filters such that all or most of the guard tones can be left available for data. The system needs to transmit data on the guard tones in order to meet FCC regulations.

Robustness is a key concern in wireless communication systems. One way to make a wireless link more robust is to have a side channel. The side channel may be used to move information from the transmitter to the receiver or vice versa.

Therefore, it would be desirable to have a method for increasing OFDM transmission robustness by using the guard tones.

SUMMARY OF THE INVENTION

The present invention provides a method and system for increasing communication robustness between wireless communication devices by transmitting data on Orthogonal Frequency Division Multiplexing (OFDM) guard tones. In one embodiment, punctured bits are sent on the guard tones. In an alternate embodiment, the full bandwidth provided by the guard tones in used to determine the optimal puncture pattern.

The present invention can also use guard tones to duplicate data from those tones which are experiencing channel interference. This is accomplished by using known pad bits after interleaving at the transmitter and/or the channel estimation sequence. The receiver feeds back information about tones in interference, and the transmitter send the interfered data on the guard tones.

Guard tones are used for sending feedback information to the transmitter in order to increase system robustness. For example, the receiver may feed back information about tones in error, reliability of packet decoding, interfering tones, etc. This provides the transmitter with information on how to use the guard tones and adapt the transmission data rates to maximize system performance.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 2:
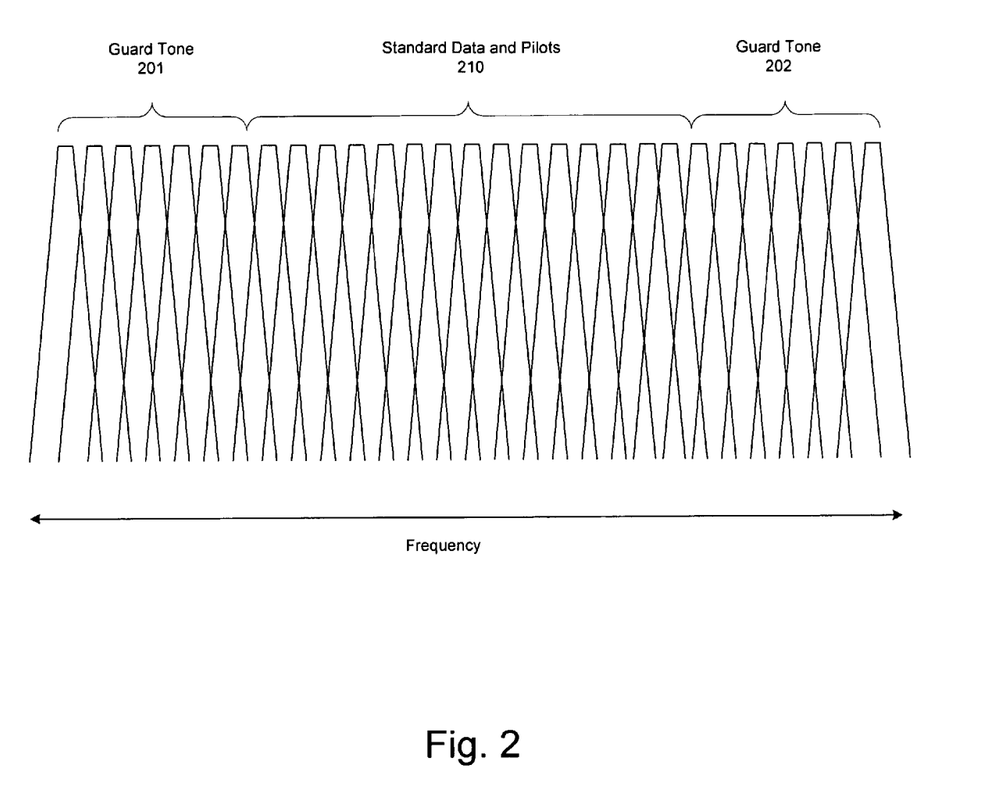
FIG. 2 illustrates the relationship between the main and side channels in the frequency domain.

FIG. 2 illustrates the relationship between the main and side channels in the frequency domain. The guard tones 201, 202 modulate data beside the main data and pilot tones 210 in the frequency domain. In practice, the guard tones can be viewed as a channel to communicate information between two devices in the network without causing the devices to be non-compliant with the standard specifications for the data tones and pilot tones.

Guard tones are bits that are left open by the standard for use by developers in customizing their designs. In the example depicted in FIG. 2, the guard tones 201, 202 lie completely outside the frequencies occupied by the standard data and pilots tones.

Figure 3:
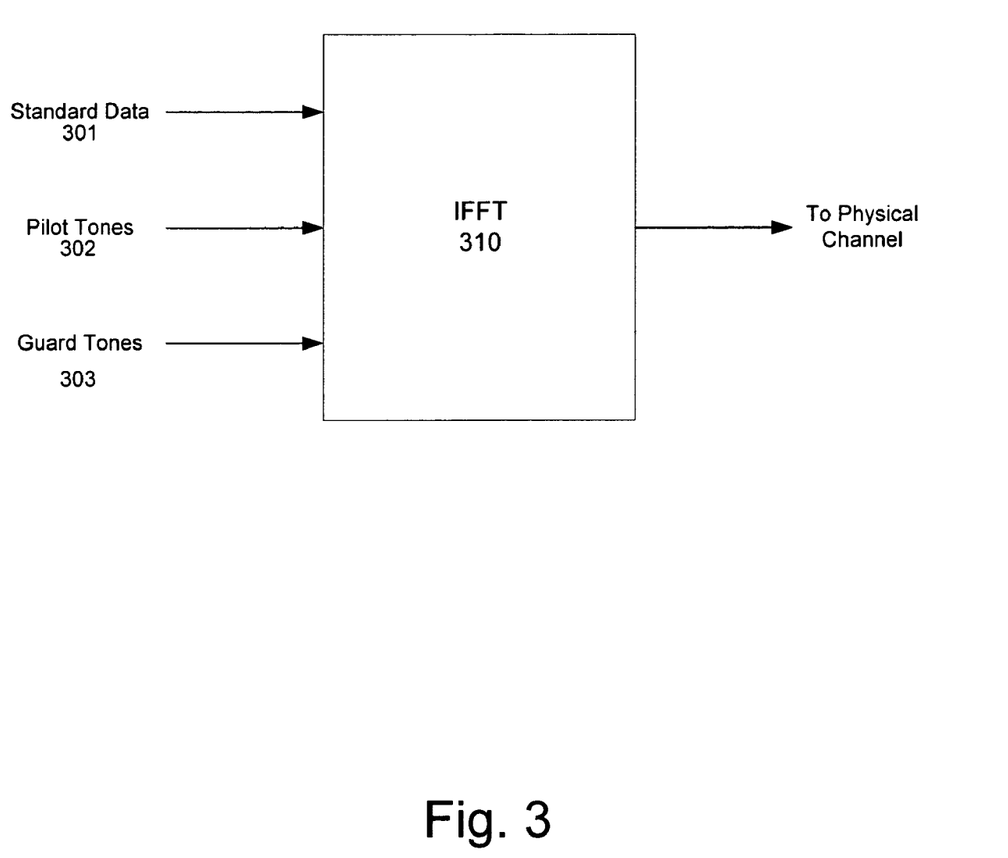
FIG. 3 shows an Inverse Fast Fourier Transform (IFFT) in accordance with the present invention.

FIG. 3 shows an Inverse Fast Fourier Transform (IFFT) in accordance with the present invention. The main data components that are fed into the IFFT 310 are the standard data 301, the pilot tones 302, and guard tones 303. The standard data 301 included the information contents of the signal. The pilot tones 302 are known tones that are used to inform the receiver as to the face of the signal. Pilot tones are used for phase offset tracking and correction, wherein the phase of the reference pilot tones is compared with the received tones to estimate and correct any phase offset at the receiver, thus correcting any clock mismatch between the transmitter and receiver.

In decision directed tracking mode, there are no pilot tones. Instead, the pilot tones are replaced by data. The phase offset can be estimated by more sophisticated signal processing algorithms which make decisions on the received data to estimate, track and correct the phase. Decision-directed tracking is well known in the art.

The guard tones 303 are the same as those defined in the Multiband OFDM proposal to the IEEE 802.15.3a committee, which is hereby incorporated by reference. There are 10 guard tones in the standard. These tones must be transmitted upon, but what is modulated on them is left to the implementer. The present invention uses these guard tones, or a subset thereof, to increase the robustness of wireless communication. Furthermore, if the system employs decision-directed tracking, the pilot tones may be replaced by guard tones, which can be used for additional robustness.

Figure 4:
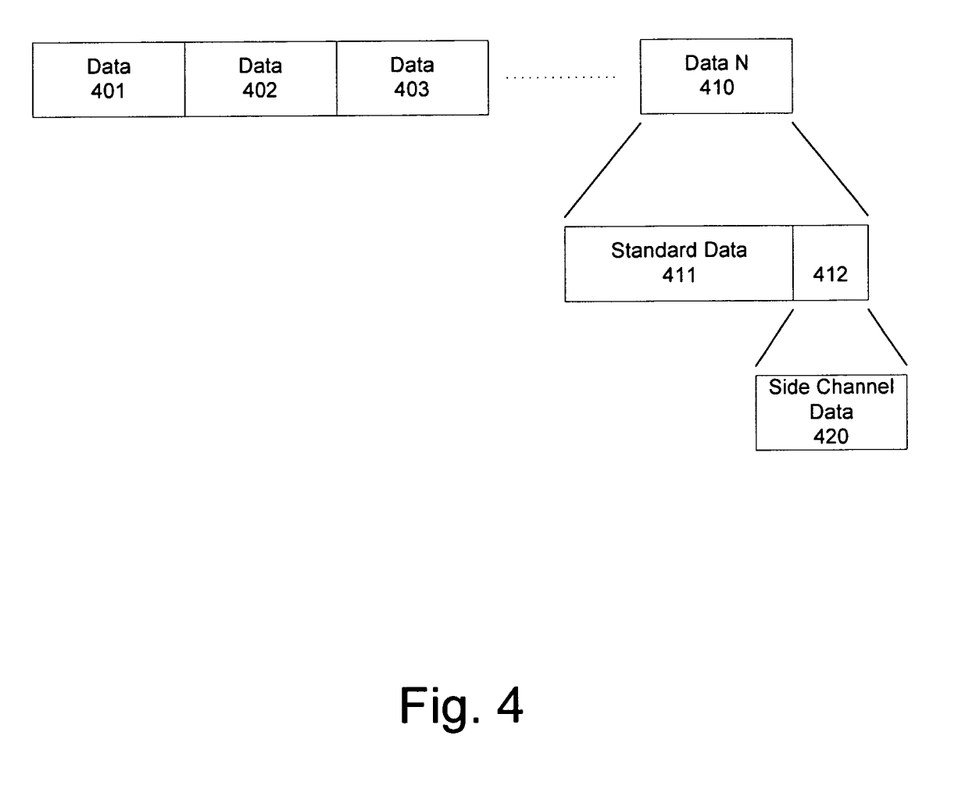
FIG. 4 shows the data structure for using Acknowledgment packets as side channels.

FIG. 4 shows the data structure for using Acknowledgment packets as side channels. Acknowledgement (ACK) packets in Wireless Local Area Network (WLAN) and Wireless Personal Area Network (WPAN) systems typically have a fixed amount of data (e.g., 14 bytes). However, the minimum number of OFDM symbols may be able to carry much more information than 14 bytes (112 bits) of data. For example, at 480 Mbps, the Multiband OFDM proposal to the IEEE 802.15.3a Task Group can transport approximately 480 Mbps*0.3125 us=150 bits of data. In this physical layer system, the remainder of the OFDM symbol is typically padded with zeros or random bits.

Furthermore, in OFDM systems, the number of bits that may be carried tends to be an integer number of some number of bits (e.g., N×150 bits). Therefore, there is a high probability that some padding of zeros or random bits will be required.

For example, the data packets 401, 402, 403, 410 may carry 1800 bits, but the data content is only 1730 bits. In this case, the remaining 70 bits would comprise padding. The structure of Data N 410 depicts the relationship between the standard data content 411 and the unused portion 412 that is typically comprised of padding.

In the present invention, the extra bits 412 in the OFDM symbols are not padded with zeros or random but instead are used as a side channel 420. Again, such an implementation allows the device in question to remain fully interoperable with other devices. However, those other devices that are aware of the side channel may use it to convey information that enhances performance.

While the guard tones 201, 202 are constant, the side channels within the standard data (e.g. 420) may vary.

Figure 5:
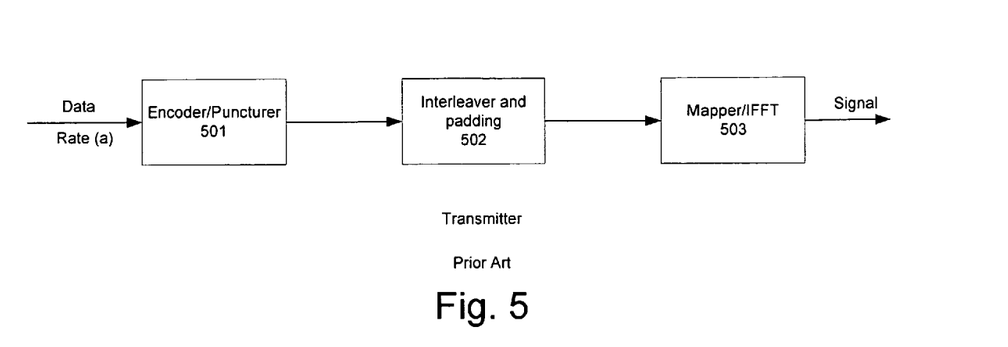
FIG. 5 shows the prior art method for transmitting wireless data without using the guard tones.

FIG. 5 shows the prior art method for transmitting wireless data without using the guard tones. Data is fed into the Encoder/puncturer 501 at code rate (a). The code rate is expressed as a ratio of the number of bits (k) input into the encoder to the number of channel symbols (n) output by the encoder in a given encoder cycle.

Punctured codes are a common way of achieving higher code rates (i.e. larger ratios of k to n). Punctured codes are created by first encoding data using a rate 1/n encoder and then deleting some of the channel symbols at the output of the encoder. This process of deleting channel output symbols is called puncturing.

For example, to create a rate 3/4 code from a rate 1/2 code, one would delete channel symbols in accordance with the following puncturing pattern:

| 1 | 0 | 1 |
|---|---|---|
| 1 | 1 | 0 | where a '1' indicates that a channel symbol is to be transmitted, and a '0' indicates that a channel symbol is to be deleted. To see how this makes the rate 3/4, think of each column as corresponding to a bit input into the encoder, and each '1' in the table as corresponding to an output channel symbol. There are three columns in the table, and four '1's.

The punctured code is fed into the interleaver 502 and pad bits are added if necessary as described above. From there, the code is mapped to a physical transmission signal by the mapper 503.

The present invention uses the guard tones on both the transmit-to-receive data transfer and the receive-to-transmit acknowledgements to increase the robustness in the system.

Figure 6:
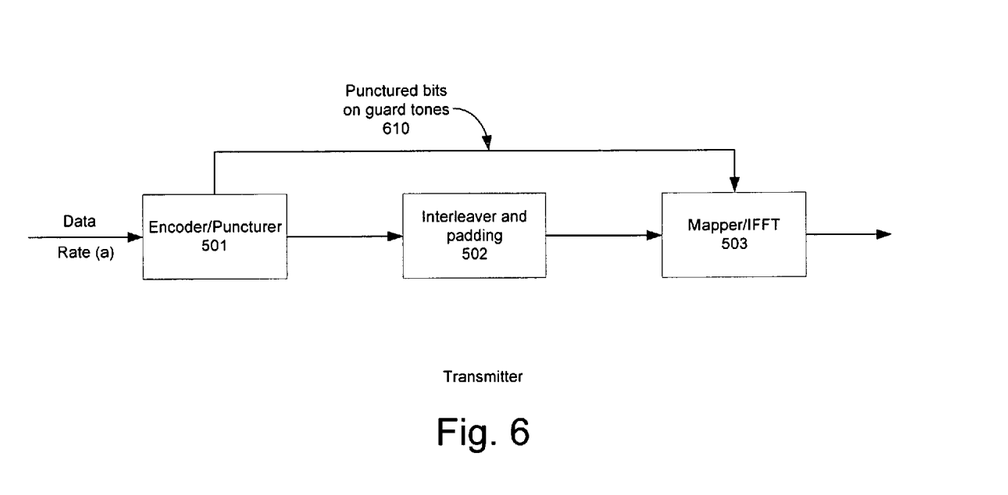
FIG. 6 shows a method for using guard tones to send punctured data in accordance with the present invention.

FIG. 6 shows a method for using guard tones to send punctured data in accordance with the present invention. Error-correcting codes are used in wireless OFDM systems in order to provide reliable transmission over wireless channels. These codes are frequently punctured (as described above) in good channel conditions in order to increase the data rates. The present invention takes the puncture bits and sends them on some or all of the guard tones at the transmitter to increase reliability of decoding. This can be accomplished in two ways.

In the first embodiment, the punctured data is made rate-compatible with the original (unpunctured) code. The punctured bits are then sent separately on the guard tones 610 (see FIG. 6) while the non-punctured data is transmitted on non-guard data tones. Encoded data is non-exclusively encoded onto the non-guard tones, and the encoded data transmitted on the guard tones is parity/redundancy information.

This method allows the system to use the same code rate (a) as that used in the prior art method of FIG. 5 while achieving greater robustness and error protection equal to that of code with ~10% lower code rate.

The second approach increases robustness by designing new coding schemes with the best puncturing pattern possible accounting for the fact that the system can use guard tones for data transmission. The system assumes the additional available bandwidth provided by the guard tones and takes advantage of the full spectrum when determining the optimal puncture pattern. This approach allows for a lower code rate (b) due to the additional bandwidth, which provides more redundancy in the data.

Figure 7:
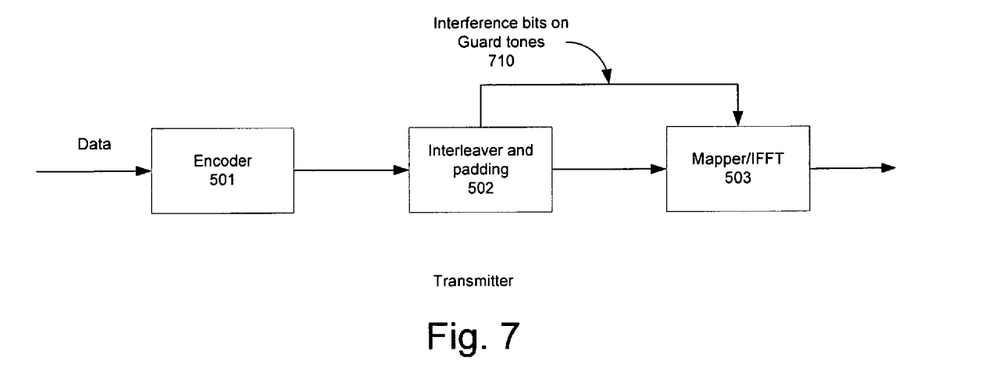
FIG. 7 shows a method for using guard tones to send interference bits in accordance with the present invention.

FIG. 7 shows a method for using guard tones to send interference bits in accordance with the present invention. The guard tones at the transmitter can also be used to provide signaling information that helps avoid interference at the receiver. If tones that are in interference are detected, the information in those tones can be duplicated in the guard tones for increasing the robustness of the system.

In order to get an estimate for the tones that are in interference at the transmitter, the pad bits at the interleaver output are set to known data. This information can be compared at the receiver along with the channel estimation sequence in order to get an estimate of the tones in error.

Once the error tones are estimated, they are relayed back to the transmitter, which sends the tones suffering from interference 710 on the guard tones. In order to inform the receiver as to which tones are being duplicated at which guard tone, some of the guard tones can be used to provide signaling information.

The following example illustrates the process of duplicating error tones on guard tones:

| System 1: | | System 2: |
|---|---|---|
| guard bin 1-6 | | guard bin 1-6 |
| data bin 1 | | data bin 1 |
| data bin 2 | channel corrupts 2 | garbage |
| ... | | ... |
| data bin 100 | | data bin 100 |
| guard 7-12 | | guard 7-12 |

In the above example, interference causes data bin 2 to be in error. In response, the transmitter duplicates the information from bin 2 on guard tone 7 and uses guard tone 6 to provide signaling information for guard to 7, informing the receiver that guard tone 7 has the duplicated information from bin 2. If there are multiple tones in interference, the receiver can tell the transmitter the order of priority for the interference, and the transmitter can use that order to repeat the tones and signaling.

Figure 8:
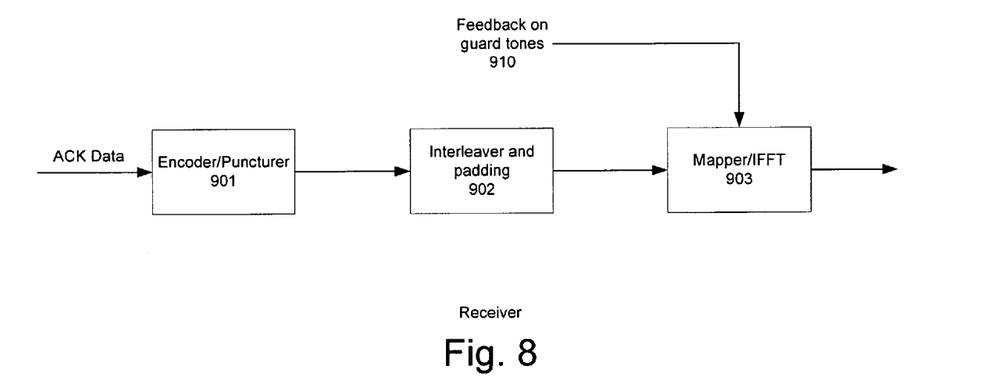
FIG. 8 shows a method for using guard tones to send feedback during acknowledgment in accordance with the present invention.

FIG. 8 shows a method for using guard tones to send feedback during acknowledgment in accordance with the present invention. Whereas the methods depicted in FIGS. 6 and 7 take place at the transmitter, the process depicted in FIG. 8 is on the receiver side. Guard tones can be used while acknowledging the transmission by the receiver to provide feedback to the transmitter to increase system robustness. While acknowledging, the guard tones can convey information about tone interference, decoding reliability, tones reliability and other feedback information. The transmitter uses this feedback information to adapt the transmission data rates and help it to decide how to best use the guard tones to boost system performance.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A method for providing communication robustness between wireless communication devices, the method comprising:
   (a) identifying a set of guard tones for wireless Orthogonal Frequency Division Multiplexing (OFDM) signals;
   (b) encoding, by an apparatus, data for OFDM transmission and puncturing said encoded data; and
   (c) transmitting, by the apparatus, said encoded data, wherein a portion of said encoded data is transmitted on a portion of said set of guard tones, wherein the encoded data transmitted on guard tones includes the punctured bits.

2. The method of claim 1, wherein the encoded data is non-exclusively encoded onto non-guard tones.

3. The method according to claim 1, wherein:
   transmitting said encoded data further comprises transmitting the non-punctured encoded data on non-guard tones.

4. The method according to claim 1, wherein the punctured code is rate-compatible with the unpunctured code.

5. The method according to claim 1, wherein the wireless communication includes an industry standard for OFDM systems.

6. A method for providing communication robustness between wireless communication devices, the method comprising:
   (a) identifying a set of guard tones for wireless Orthogonal Frequency Division Multiplexing (OFDM) signals;
   (b) encoding, by an apparatus, data for OFDM transmission and puncturing said encoded data, wherein the puncture pattern takes account of the total combined transmission bandwidth provided by both guard tones and non-guard tones; and
   (c) transmitting, by the apparatus, said encoded data, wherein a portion of said encoded data is transmitted on a portion of said set of guard tones, wherein the encoded data transmitted on guard tones includes parity or redundancy information.

7. A method for providing communication robustness between wireless communication devices, the method comprising:
   (a) identifying a set of guard tones for wireless Orthogonal Frequency Division Multiplexing (OFDM) signals;
   (b) encoding, by an apparatus, data for OFDM transmission;
   (c) transmitting, by the apparatus, said encoded data, wherein a portion of said encoded data is transmitted on a portion of said set of guard tones;
   (d) receiving feedback information from a receiver regarding interference of data tones; and
   (e) for any data tone experiencing interference, duplicating the information content of said data tone onto a first available guard tone,
   wherein duplicating the information content further comprises sending signaling data on a second available guard tone, and
   wherein said signaling data notifies the receiver about the duplicate information sent on the first guard tone.

8. A method for providing communication robustness between wireless communication devices, the method comprising:
   (a) identifying a set of guard tones for wireless Orthogonal Frequency Division Multiplexing (OFDM) signals;
   (b) encoding, by an apparatus, data for OFDM transmission;
   (c) transmitting, by the apparatus, said encoded data, wherein a portion of said encoded data is transmitted on a portion of said set of guard tones;
   (d) receiving feedback information from a receiver regarding interference of data tones; and
   (e) for any data tone experiencing interference, duplicating the information content of said data tone onto a first available guard tone, and
   wherein the receiver estimates data tones in error by examining interleaver pad bits that are set to known data.

9. A method for providing communication robustness between wireless communication devices, the method comprising:
   (a) identifying a set of guard tones for wireless Orthogonal Frequency Division Multiplexing (OFDM) signals;
   (b) encoding, by an apparatus, data for OFDM transmission;
   (c) transmitting, by the apparatus, said encoded data, wherein a portion of said encoded data is transmitted on a portion of said set of guard tones;
   (d) receiving feedback information from a receiver regarding interference of data tones; and
   (e) for any data tone experiencing interference, duplicating the information content of said data tone onto a first available guard tone, and
   wherein the receiver estimates data tones in error by examining a channel estimation sequence.

10. A method for providing communication robustness between wireless communication devices, the method comprising:
    (a) identifying a set of guard tones for wireless Orthogonal Frequency Division Multiplexing (OFDM) signals;
    (b) encoding, by an apparatus, data for OFDM transmission;
    (c) transmitting, by the apparatus, said encoded data, wherein a portion of said encoded data is transmitted on a portion of said set of guard tones;
    (d) receiving feedback information from a receiver regarding interference of data tones; and
    (e) for any data tone experiencing interference, duplicating the information content of said data tone onto a first available guard tone, and
    wherein the feedback information from the receiver is sent on the guard tones of transmission acknowledgment signals.

11. An apparatus for providing communication robustness between wireless communication devices, the apparatus comprising:
    (a) an encoder that encodes data for Orthogonal Frequency Division Multiplexing (OFDM) transmission and punctures said encoded data; and (b) a signal transmitter that transmits said encoded data, wherein a portion of said encoded data is transmitted on OFDM guard tones, wherein the encoded data transmitted on guard tones includes the punctured bits.

12. The apparatus according to claim 11, wherein the encoded data is non-exclusively encoded onto non-guard tones.

13. The apparatus according to claim 11, wherein:
the signal transmitter in part (b) transmits the non-punctured encoded data on non-guard tones.

14. The apparatus according to claim 11, wherein the punctured code is rate-compatible with the unpunctured code.

15. The apparatus according to claim 11, wherein the wireless communication includes an industry standard for OFDM systems.

16. An apparatus for providing communication robustness between wireless communication devices, the apparatus comprising:
(a) an encoder that encodes data for Orthogonal Frequency Division Multiplexing (OFDM) transmission and punctures said encoded data, wherein the puncture pattern takes account of the total combined transmission bandwidth provided by both guard tones and non-guard tones; and
(b) a signal transmitter that transmits said encoded data, wherein a portion of said encoded data is transmitted on OFDM guard tones, wherein the encoded data transmitted on guard tones includes parity or redundancy information.

17. An apparatus for providing communication robustness between wireless communication devices, the apparatus comprising:
(a) an encoder that encodes data for Orthogonal Frequency Division Multiplexing (OFDM) transmission;
(b) a signal transmitter that transmits said encoded data, wherein a portion of said encoded data is transmitted on OFDM guard tones;
(c) a signal receiver that receives feedback information regarding interference of data tones;
wherein, for any data tone experiencing interference, the signal transmitter in part (b) duplicates the information content of said data tone onto a first available guard tone,
wherein the signal transmitter in part (b) sends signaling data on a second available guard tone, and
wherein said signaling data provides notification about the duplicate information sent on the first guard tone.

18. An apparatus for providing communication robustness between wireless communication devices, the apparatus comprising:
(a) an encoder that encodes data for Orthogonal Frequency Division Multiplexing (OFDM) transmission;
(b) a signal transmitter that transmits said encoded data, wherein a portion of said encoded data is transmitted on OFDM guard tones;
(c) a signal receiver that receives feedback information regarding interference of data tones;
wherein, for any data tone experiencing interference, the signal transmitter in part (b) duplicates the information content of said data tone onto a first available guard tone, and
wherein data tones in error are estimated by examining interleaver pad bits that are set to known data.

19. An apparatus for providing communication robustness between wireless communication devices, the apparatus comprising:
(a) an encoder that encodes data for Orthogonal Frequency Division Multiplexing (OFDM) transmission;
(b) a signal transmitter that transmits said encoded data, wherein a portion of said encoded data is transmitted on OFDM guard tones;
(c) a signal receiver that receives feedback information regarding interference of data tones;
wherein, for any data tone experiencing interference, the signal transmitter in part (b) duplicates the information content of said data tone onto a first available guard tone, and
wherein data tones in error are estimated by examining a channel estimation sequence.

20. An apparatus for providing communication robustness between wireless communication devices, the apparatus comprising:
(a) an encoder that encodes data for Orthogonal Frequency Division Multiplexing (OFDM) transmission;
(b) a signal transmitter that transmits said encoded data, wherein a portion of said encoded data is transmitted on OFDM guard tones;
(c) a signal receiver that receives feedback information regarding interference of data tones;
wherein, for any data tone experiencing interference, the signal transmitter in part (b) duplicates the information content of said data tone onto a first available guard tone, and
wherein the feedback information is sent on the guard tones of transmission acknowledgment signals.

21. An apparatus comprising:
means for encoding data for OFDM transmission and puncturing said encoded data; and
means for transmitting said encoded data, wherein a portion of said encoded data is transmitted on a portion of a set of guard tones for wireless Orthogonal Frequency Division Multiplexing (OFDM) signals, wherein the encoded data transmitted on guard tones includes the punctured bits.

22. A transmitter comprising:
an antenna;
an encoding unit that encodes data for Orthogonal Frequency Division Multiplexing (OFDM) transmission and punctures said encoded data; and
a signal transmission unit that transmits said encoded data via said antenna, wherein a portion of said encoded data is transmitted on OFDM guard tones, wherein the encoded data transmitted on guard tones includes the punctured bits.

23. A transmitter comprising:
an antenna;
an encoding unit that encodes data for Orthogonal Frequency Division Multiplexing (OFDM) transmission and punctures said encoded data, wherein the puncture pattern takes account of the total combined transmission bandwidth provided by both guard tones and non-guard tones; and
a signal transmission unit that transmits said encoded data via said antenna, wherein a portion of said encoded data is transmitted on OFDM guard tones, wherein the encoded data transmitted on guard tones includes parity or redundancy information.

24. A transmitter comprising:
an antenna;
an encoding unit that encodes data for Orthogonal Frequency Division Multiplexing (OFDM) transmission;
a signal transmission unit that transmits said encoded data via said antenna, wherein a portion of said encoded data is transmitted on OFDM guard tones; and a signal reception unit that receives feedback information via said antenna regarding interference of data tones;

wherein, for any data tone experiencing interference, the signal transmission unit duplicates the information content of said data tone onto a first available guard tone, wherein the signal transmission unit sends signaling data on a second available guard tone, and wherein said signaling data provides notification about the duplicate information sent on the first guard tone.

25. A transmitter comprising:

an antenna;

an encoding unit that encodes data for Orthogonal Frequency Division Multiplexing (OFDM) transmission;

a signal transmission unit that transmits said encoded data via said antenna, wherein a portion of said encoded data is transmitted on OFDM guard tones; and a signal reception unit that receives feedback information via said antenna regarding interference of data tones;

wherein, for any data tone experiencing interference, the signal transmission unit duplicates the information content of said data tone onto a first available guard tone, and wherein data tones in error are estimated by examining interleaver pad bits that are set to known data.

26. A transmitter comprising:

an antenna;

an encoding unit that encodes data for Orthogonal Frequency Division Multiplexing (OFDM) transmission;

a signal transmission unit that transmits said encoded data via said antenna, wherein a portion of said encoded data is transmitted on OFDM guard tones; and a signal reception unit that receives feedback information via said antenna regarding interference of data tones;

wherein, for any data tone experiencing interference, the signal transmission unit duplicates the information content of said data tone onto a first available guard tone, and wherein data tones in error are estimated by examining a channel estimation sequence.

27. A transmitter comprising:

an antenna;

an encoding unit that encodes data for Orthogonal Frequency Division Multiplexing (OFDM) transmission;

a signal transmission unit that transmits said encoded data via said antenna, wherein a portion of said encoded data is transmitted on OFDM guard tones; and a signal reception unit that receives feedback information via said antenna regarding interference of data tones;

wherein, for any data tone experiencing interference, the signal transmission unit duplicates the information content of said data tone onto a first available guard tone, and wherein the feedback information is sent on the guard tones of transmission acknowledgment signals.

28. An apparatus comprising:

means for encoding data for OFDM transmission and puncturing said encoded data, wherein the puncture pattern takes account of the total combined transmission bandwidth provided by both guard tones and non-guard tones; and means for transmitting said encoded data, wherein a portion of said encoded data is transmitted on a portion of said a set of guard tones for wireless Orthogonal Frequency Division Multiplexing (OFDM) signals, wherein the encoded data transmitted on guard tones includes parity or redundancy information.

29. An apparatus comprising:

means for encoding data for OFDM transmission;

means for transmitting said encoded data, wherein a portion of said encoded data is transmitted on a portion of a set of guard tones for wireless Orthogonal Frequency Division Multiplexing (OFDM) signals;

means for receiving feedback information from a receiver regarding interference of data tones; and means for duplicating, for any data tone experiencing interference, the information content of said data tone onto a first available guard tone, wherein the means for duplicating further comprises means for sending signaling data on a second available guard tone, and wherein said signaling data notifies the receiver about the duplicate information sent on the first guard tone.

30. An apparatus comprising:

means for encoding data for OFDM transmission;

means for transmitting said encoded data, wherein a portion of said encoded data is transmitted on a portion of a set of guard tones for wireless Orthogonal Frequency Division Multiplexing (OFDM) signals;

means for receiving feedback information from a receiver regarding interference of data tones; and means for duplicating, for any data tone experiencing interference, the information content of said data tone onto a first available guard tone, and wherein the receiver estimates data tones in error by examining interleaver pad bits that are set to known data.

31. An apparatus comprising:

means for encoding data for OFDM transmission;

means for transmitting said encoded data, wherein a portion of said encoded data is transmitted on a portion of a set of guard tones for wireless Orthogonal Frequency Division Multiplexing (OFDM) signals;

means for receiving feedback information from a receiver regarding interference of data tones; and means for duplicating, for any data tone experiencing interference, the information content of said data tone onto a first available guard tone, and wherein the receiver estimates data tones in error by examining a channel estimation sequence.

32. An apparatus comprising:

means for encoding data for OFDM transmission;

means for transmitting said encoded data, wherein a portion of said encoded data is transmitted on a portion of a set of guard tones for wireless Orthogonal Frequency Division Multiplexing (OFDM) signals;

means for receiving feedback information from a receiver regarding interference of data tones; and means for duplicating, for any data tone experiencing interference, the information content of said data tone onto a first available guard tone, and wherein the feedback information from the receiver is sent on the guard tones of transmission acknowledgment signals.

* * * * *

UNITED STATES PATENT AND TRADEMARK OFFICE
CERTIFICATE OF CORRECTION

PATENT NO.        : 7,830,782 B2                                                      Page 1 of 1
APPLICATION NO.   : 11/125714
DATED             : November 9, 2010
INVENTOR(S)       : Shoemake et al.

It is certified that error appears in the above-identified patent and that said Letters Patent is hereby corrected as shown below:

Column 12, Line 01, Claim 28: "said a set of guard tones" to read as "a set of guard tones"

Signed and Sealed this
Sixth Day of March, 2012

David J. Kappos
*Director of the United States Patent and Trademark Office*